Jan. 8, 1952     B. H. SHINN ET AL     2,581,941
BRAKE WITH LUBRICATED DISK
Filed July 24, 1946     2 SHEETS—SHEET 1
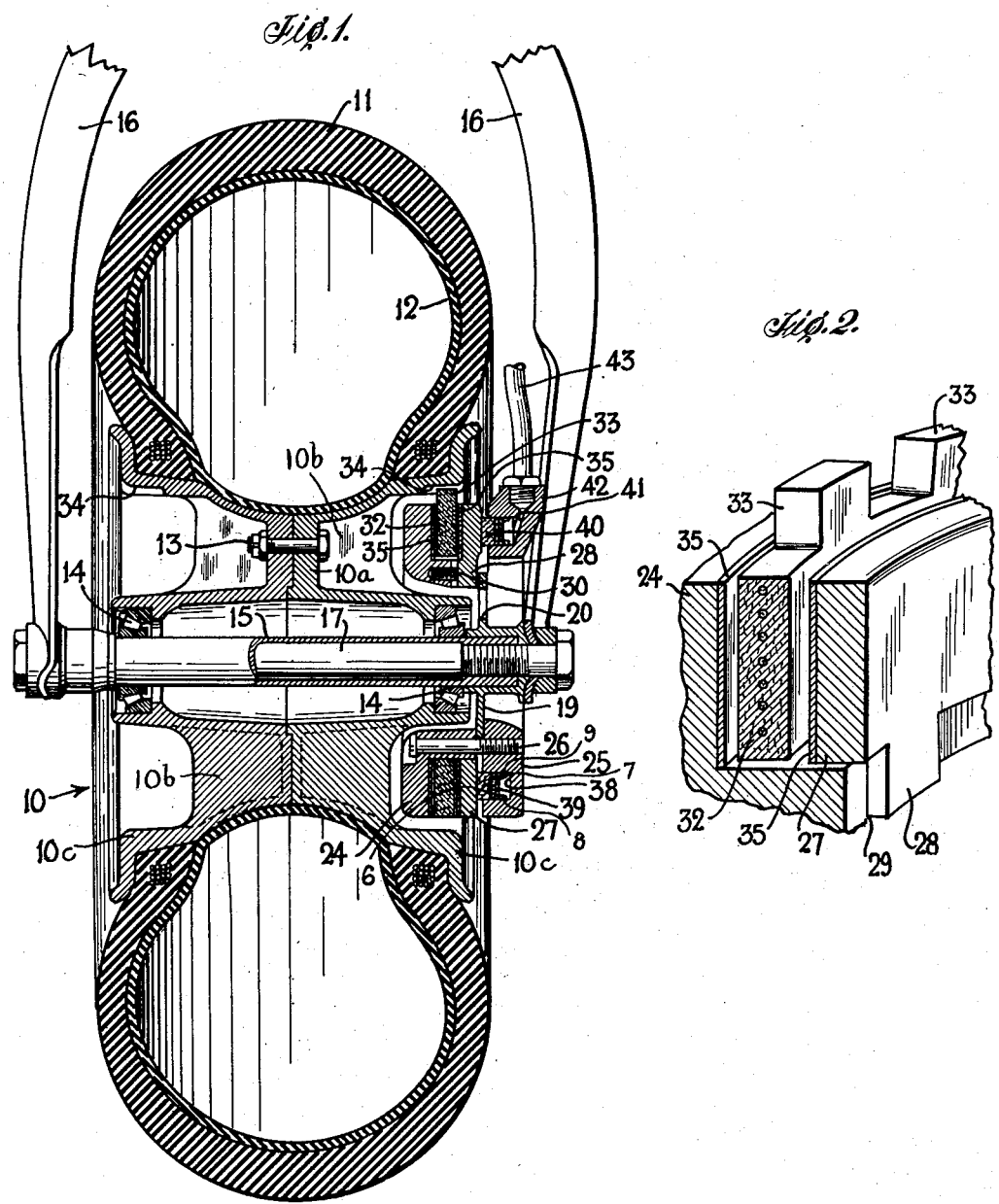
INVENTORS
BYRON H. SHINN
AND
JOHN E. ULLMAN
BY
ATTORNEYS

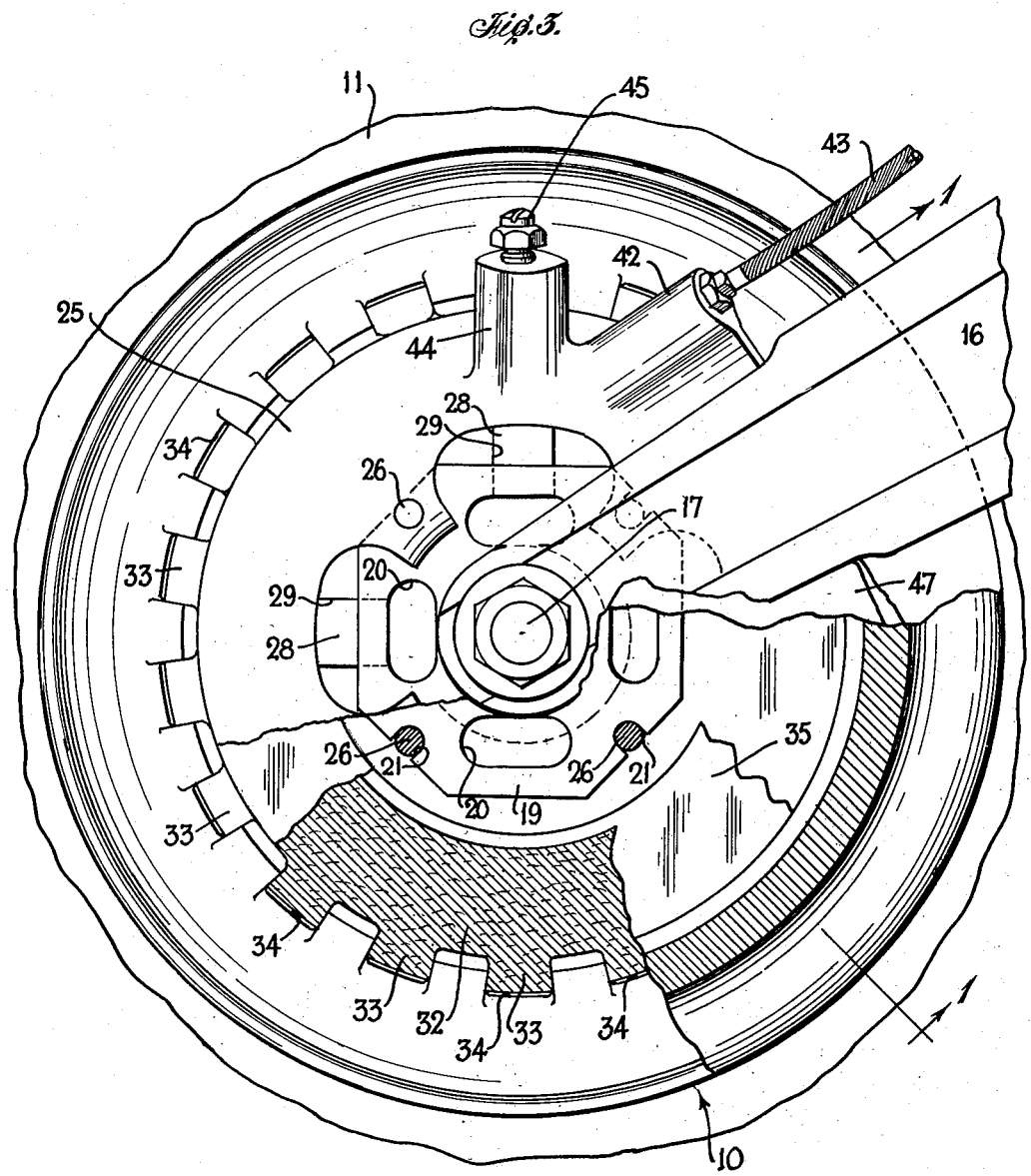

Patented Jan. 8, 1952

2,581,941

UNITED STATES PATENT OFFICE 2,581,941

BRAKE WITH LUBRICATED DISKS

Byron H. Shinn, Springfield Township, Summit County, Ohio, and John E. Ullman, Dublin, Pa., assignors to The Firestone Tire & Rubber Company, Akron, Ohio, a corporation of Ohio Application July 24, 1946, Serial No. 686,004

2 Claims. (Cl. 188—72)

This invention relates to improvements in brakes of the disc type.

The primary object of the invention resides in the provision of an improved disc brake particularly applicable to aircraft use but which may advantageously be employed on other types of vehicles.

More specifically, an important object of the invention resides in the provision of an improved brake structure of compact design but having improved heat dissipation characteristics to insure reliability of operation even under overload conditions as well as improved brake life.

Another important object is to provide a brake of a design wherein frictionally generated heat is dissipated not only by radiation but by conduction throughout a relatively massive heat conducting material, the heat storing capacity of which insures against prolonged retention of injurious temperatures in the immediate area of the brake discs.

It is a further object of the invention to provide an improved primary frictional member.

Other objects and advantages of the present invention will become readily apparent to persons skilled in the art upon examination of the drawings, description and claims appended thereto.

In the drawings:

Fig. 1 is a vertical section taken through an aircraft wheel structure along line 1—1, Fig. 3, which includes the preferred embodiment of the present invention;

Fig. 2 is a fragmentary perspective of friction elements shown in Fig. 1; and

Fig. 3 is an enlarged elevational view of the brake structure of Fig. 1, partially broken away to best show the construction thereof.

Referring to Fig. 1, an airplane wheel, generically designated 10, is of the split type comprising web portions 10b adapted to interlock at 10a, the wheel portions being maintained in clamped engagement by bolts 13. Conventional flanges 10c are provided for retention of a pneumatic airplane tire 11, including inner tube 12. Wheel 10 is rotatably mounted by means of suitable bearings 14 disposed in channeled hub portions on a tubular axle 15 maintained clamped between a pair of depending vehicle supporting fork arms 16 by a suitable clamping bolt 17 extending through axle 15. The brake structure includes a torque plate 19 disposed intermediate the terminus of a fork arm 16 and associated bearing 14, plate 19 including a hub portion which in effect provides a spacer between the center race of bearing 14 and arm 16.

As best shown in Fig. 3, torque plate 19 is of octagonal configuration with weight reducing apertures 20 and is preferably of a light metal such as aluminum or a suitable alloy.

Torque plate 19 is mounted on axle 15, Fig. 1, intermediate fork 16 and bearing 14 to position bearing 14 axially. Plate 19 is provided with a plurality of marginal notches 21 for the following purpose.

The torque plate carries an annular inboard disc 24, and an annular mounting ring 25, which disc and ring are secured to each other, and to the torque plate 19 disposed therebetween at the inner circumferences thereof, by four cap screws 26, 26, the latter being received in respective notches 21 of the torque plate. Supported on the inboard disc 24, between the latter and the mounting ring 25, is an outboard disc 27 limited in axial movement from and toward the mounting ring 25, but restrained against angular (rotary) movement relatively thereto. To this end the outboard disc 27 is formed on its inner circumference with radially inwardly projecting lugs or ears 28, which lugs are received in suitable complementally shaped recesses or slots 29 formed in the inboard disc 24. For urging the outboard disc 27 toward the mounting ring 25, the bottoms of the recesses 29 in the inboard disc 24 are recessed to receive respective compression springs 30, which springs bear against the confronting faces of the lugs 28 and normally urge the outboard disc axially toward the mounting ring 25. The inboard and outboard discs are composed of aluminum and the mounting ring is composed of magnesium alloy.

The inboard disc 24 and the outboard disc 27 constitute the stator members of the brake structure of the invention, the dynamic or rotary member being an annular brake-lining disc 32 positioned between said disc 24, 27, and carried by and rotating with the wheel 10. To this end the periphery of the brake-lining disc 32 is formed with a circumferential series of radially outwardly projecting lugs 33, 33, which lugs are received in respective complementally shaped recesses 34 formed in the inner circumference of the overhanging bead-seating portions 10c of the wheel 10. The recesses 34 are of such extent axially of the wheel as to enable movement of the brake lining in an axial direction, the arrangement being such that when the outboard disc 27 is urged away from the mounting ring 25 and toward the brake disc 32, the latter may shift in position if necessary so that its opposite lateral faces are engaged by the inboard disc and the outboard disc with equal pressure whereby uniformity of stress and wear is achieved.

A salient feature of the invention is that the confronting faces of the inboard and outboard discs 24, 27, between which the brake-lining disc 32 is positioned, have friction facings composed of copper or copper alloy, the same being in the form of relatively thin annular discs of commercially pure copper or copper alloy 35, 35. The latter are secured to the discs 24, 27, in any suitabel manner, such for example, as by riveting, as will be understood by those familiar with the art. While the members 35, 35 are shown as annular discs it is to be understood that they may be segmented if desired.

The brake lining disc is composed principally of heat resisting material used for brake lining, and may have metal or other reinforcing members therein if desired. An example of brake lining material found satisfactory is an asbestos base compound of hard molded form composed of amorphous asbestos, and not less than eight nor more than twenty per cent lubricant such, for example, but without limitation, as graphite. Although the use of graphite in brake lining is not new per se, its use heretofore, so far as applicants have been able to learn, has not exceeded three per cent of the volume of lining material. In the present invention there is a minimum of eight per cent and a maximum of twenty per cent graphite. It has been determined that in operation when the brake lining is composed of less than eight per cent graphite that the surface of the copper, or copper alloy, member is injured. It has also been found that if the brake lining is composed of from eight to twenty per cent graphite that the copper, or copper alloy, surface will not be injured and abrasion will be at a minimum, but that if the lining is composed of more than twenty per cent graphite the brake is unsatisfactory due to low friction.

For energizing the brake, that is, for forcing the outboard disc 27 axially toward the brake-lining disc 32, suitable hydraulic means under manual control is provided. To this end the mounting ring 25 has the face thereof that confronts the outboard disc 27 formed with a deep circumferential recess 38, in which recess is located an annular lip-seal 39 composed of rubber or rubber-like material. Sealing edges 8 and 9 of the ring 39 face axially outwardly and contact the sides of recess 38 against which sides a fluid seal is effected. The base portion 7 of ring 39 is attached to a relatively thin aluminum pusher ring 6 by vulcanization, or by any means found satisfactory. The pusher ring 6 abuts ring 40, which ring 40 is axially slidable in recess 38. For forcing the pusher ring 6 against ring 40, and in turn ring 40 into engagement with the outboard disc 27 to move the same axially against the brake-lining disc 32, oil under pressure is admitted to the recess 38 through a duct 41 that extends from said recess 38 to the perimeter of the mounting ring by way of a boss-like protuberance 42 on the outwardly presented lateral face of the mounting ring. A flexible conduit 43 communicates with the outer end of the duct 41, said conduit extending to a source of hydraulic pressure (not shown) whereby oil for energizing the brake may be admitted thereto (and released therefrom) at the option of an operator, for example, the pilot of the aircraft. A second boss-like protuberance 44 is disposed adjacent protuberance 42, in angularly offset relation thereto, said protuberance 44 carrying a bleeder valve 45 that is in communication with the recess 38 through the agency of an internal duct (not shown) through which air trapped in recess 38 will escape.

As is shown in Figs. 1 and 3, the protuberance 42 projects outwardly from the mounting ring 25 and abuts one margin of one of the forks 16, the arrangement being such as to prevent rotary movement of the mounting ring relatively of the fork in one direction. For preventing relative movement in the opposite direction between fork and mounting ring, the latter is formed with another protuberance designated 47 that is similar to protuberance 42 but spaced angularly therefrom so as to engage the opposite margin of the same fork 16. Beside protuberance 47 may be located another protuberance (not shown) similar to protuberance 44. Protuberance 47 and the last mentioned protuberance are not formed with internal ducts in the assembly shown, but are available for that purpose if the mounting ring is to be employed on the opposite side of the wheel.

In the operation of the brake, with the wheel 10 rotating in either direction and driving the brake-lining disc 32 with it, actuation is effected by the introduction of fluid pressure to the brake through the agency of conduit 43. This forces the ring 39 laterally against the outboard disc 27 and moves the latter against the brake-lining disc 32, and the disc 32 against the inboard disc 24. Since the inboard disc and outboard disc are restrained against rotation, pressure of said discs against respective faces of the brake-lining disc develops the braking friction that brings the wheel 10 to a stop. Braking friction generates heat and this heat on the copper facings 35 of the inboard and outboard discs 24, 27 results in oxidation of the copper so that a tenacious film forms on the wear-face of the copper facings. It is believed that it is this deposit of a copper oxide, in combination with the graphite in the brake-lining disc, that is in part responsible for the superior operation of the brake, whereby abrasion of the copper is minimized and wear on the brake-lining is reduced. As evidence of this phenomenon, it has been observed that the brake operates in an improved manner after sufficient use to heat the copper facings and form a copper oxide film thereon. It is believed that the actual braking friction is developed in the film or graphite and oxide between the brake-lining and the copper facings, the particles in said film sliding upon one another and the harsh ingredients of the brake-lining being restrained from contact with the copper facings.

Structurally the brake is very simple, and superficially it is generally similar to conventional single-disc brakes. Operatively, however, the brake has superior characteristics as to kinetic energy capacity, long service life, and low operating temperatures. The brake has an overall high rate of thermal conductivity and a high degree of heat storage. This is the result of employing fabricated stator elements each having a friction surface composed of a thin sheet of high conductivity copper, and a backing consisting of a disc composed of light weight aluminum alloy having not only high thermal conductivity, but also superior heat-storage capacity. The low resistance to heat travel in the aluminum alloy discs causes a very flat heat gradient resulting in much lower than usual temperature on the friction surface and much higher than usual temperature on the outer radiating surfaces. This higher temperature in the radiating surfaces results in a much higher over-all rate of heat dissipation from the brake, and the storage capacity of the aluminum takes the peak temperatures out of sudden, excessive brake applications.

The brake has high kinetic energy value per pound of brake weight; there is no "fading," that is, diminution of braking effort even during long periods of taxiing; and the cooling time between full kinetic energy stops is much shorter than with brakes heretofore employed for a similar purpose. The brake has ample reserve capacity, and has been tested at twice its rated capacity without impairing its efficiency. The brake is quiet to silent, and the torque is smooth and steady. As the result of relatively low operating temperature, maintenance cost is low; there is an exceptionally low rate of wear, thus making adjustments unnecessary. The brake is compact, and protrudes but little from the wheel, thus simplifying the space problem for retractable landing gear.

While the present invention has been illustrated in connection with a disc brake it is to be understood that it may also be embodied in drum and other types of brakes. Aluminum fabricated with copper friction face is preferred where it is desirable to reduce the weight to a minimum, but solid copper discs may be used where weight is not a critical factor. It is also to be understood that while one means of supplying a proper amount of graphite to the friction surfaces of the brake has been shown, that any other means found satisfactory is within the conception of the present invention, since it is thought, but not definitely known, that the braking friction provided by the present invention occurs between the particles of the graphite rather than on the copper, or copper alloy surface. For this reason it will be obvious to those familiar with the art that lubricants other than graphite may be found which will function in similar manner and protect the copper or copper alloy surface. The invention therefore is not to be limited alone to graphite as a lubricant, but includes any lubricant which may be found satisfactory. Other modifications may be resorted to without departing from the spirt of the invention or the scope thereof as defined by the appended claims.

What is claimed is:

1. A wheel brake of the character described mounted between a hub bearing and a rim of a wheel, comprising a brake disc having a slidable engagement with said rim and being rotatable therewith between non-rotatable disc members mounted on said hub, said disc members having faces of copper alloy confronting the sides of the rotatable brake disc, said rotatable brake disc being composed of molded composition of amorphous asbestos, and not less than eight, or more than twenty per cent graphite lubricant.

2. A brake comprising members adapted to move into engagement with each other to develop braking friction including a non-revolvable inner disc and mounting ring secured to each other and being mounted on and secured to a torque plate, an outer disc supported on said inner disc between portions of the latter and said ring, said outer disc having limited axial movement from and toward said ring, said discs being composed of aluminum and having friction facing of thin copper attached thereto; a laterally shiftable, rotatable brake lining disc positioned between said inner and outer disc, hydraulic means adapted to urge the outer disc into contact with the brake lining disc and said latter disc into contact with said inner disc, said brake lining disc being composed of an asbestos-base compound of hard molded-form composed of asbestos, and not less than eight or more than twenty percent graphite.

BYRON H. SHINN.
JOHN E. ULLMAN.

REFERENCES CITED

The following references are of record in the file of this patent:

UNITED STATES PATENTS

| Number | Name | Date |
| --- | --- | --- |
| 1,906,711 | Norton | May 2, 1933 |
| 1,989,211 | Norton | Jan. 29, 1935 |
| 2,014,630 | O'Brien | Sept. 17, 1935 |
| 2,109,110 | Frank | Feb. 22, 1938 |
| 2,149,483 | Whitelaw | Mar. 7, 1939 |
| 2,255,024 | Eksergian | Sept. 2, 1941 |
| 2,381,941 | Wellman et al. | Aug. 14, 1945 |
| 2,389,061 | Kuzmick | Nov. 13, 1945 |